United States Patent [19]

Schenk et al.

[11] Patent Number: 5,716,111
[45] Date of Patent: Feb. 10, 1998

[54] ROTARY ACTUATED BRAKING SYSTEM

[75] Inventors: Donald Edward Schenk, Vandalia; Schuyler Scott Shaw, Dayton; John Benjamin Hageman, Vandalia; Bryan Peter Riddiford, Spring Valley, all of Ohio

[73] Assignee: General Motors Corporation, Detroit, Mich.

[21] Appl. No.: 636,085

[22] Filed: Apr. 22, 1996

[51] Int. Cl.⁶ .................................................. B60T 8/34
[52] U.S. Cl. .......................... 303/116.4; 303/61; 303/68; 303/84.2; 303/DIG. 1; 303/DIG. 2; 303/115.4; 303/115.5
[58] Field of Search ................ 303/113.1, 113.2, 303/116.1, 116.2, 116.3, 116.4, 115.1–115.6, DIG. 1, DIG. 2, 900, 901, 10–12, 113.5, 117.1, 119.2, 89, 61, 84.1, 68–69, 84.2, 114.1, 114.2; 188/181 A, 353; 417/521, 273, 523, 534, 271

[56] References Cited

U.S. PATENT DOCUMENTS

| | | | |
|---|---|---|---|
| 3,524,684 | 8/1970 | Skoyles | 303/116.4 |
| 3,549,211 | 12/1970 | Leiber | 303/116.4 |
| 3,574,416 | 4/1971 | Skoyles | 303/61 |
| 3,608,984 | 9/1971 | Skoyles | 303/68 |
| 3,724,914 | 4/1973 | Skoyles | 303/61 |
| 4,201,422 | 5/1980 | Depas, Sr. | 303/10 |
| 4,354,715 | 10/1982 | Farr et al. | 303/116 |
| 4,568,131 | 2/1986 | Blomberg et al. | 303/116.4 |
| 4,580,848 | 4/1986 | Widmer | 303/116.4 |
| 4,768,843 | 9/1988 | Baughman et al. | 303/115.4 |
| 4,875,741 | 10/1989 | Ozawa et al. | 303/116.4 |
| 4,883,327 | 11/1989 | Farr | 303/61 |
| 4,887,870 | 12/1989 | Siegel | 303/116.4 |
| 5,131,729 | 7/1992 | Wetzel | 303/115.4 |
| 5,213,482 | 5/1993 | Reinartz et al. | 303/10 |
| 5,340,285 | 8/1994 | Reinartz et al. | 417/221 |
| 5,509,729 | 4/1996 | Zaviska et al. | 303/115.4 |
| 5,511,861 | 4/1996 | Liu | 303/116.4 |

FOREIGN PATENT DOCUMENTS

| | | | |
|---|---|---|---|
| 1218950 | 9/1989 | Japan | 303/115.4 |
| 8905747 | 6/1989 | WIPO | 303/115.4 |

*Primary Examiner*—Douglas C. Butler
*Attorney, Agent, or Firm*—Jeffrey A. Sedlar

[57] ABSTRACT

A rotary actuated braking system includes a motor driven shaft that operates two pairs of piston pumps and an allocation valve which, in combination with a single solenoid valve, effects ABS operation of the braking system. A combination of pressure operated control valves and pressure operated release valves for each control wheel brake respond to operation of the rotary actuator and solenoid valve to effect ABS pressure release and reapply from the corresponding wheel brake. A power boosted master cylinder provides base brake operation independent of the rotary actuator effected ABS operation.

10 Claims, 5 Drawing Sheets

ROTARY ACTUATED BRAKING SYSTEM

BACKGROUND OF THE INVENTION

The present invention relates to a rotary actuated braking system and more particularly, to a vehicle braking system with anti-lock function capability including a rotary driven actuator that is used in braking pressure generation and in effecting brake application and release.

One commonly known type of vehicle braking system capable of ABS operation includes a motor driven pump as a pressurization source in combination with an apply and release solenoid valve for each control circuit. There are generally three or four control circuits per vehicle depending on the particular arrangement selected. Accordingly, the energy supply unit powers the electrically driven pump motor in addition to the typical six or eight solenoid valves for wheel brake pressure control and any valves needed for isolation purposes or other functions.

The electrically driven pump motor is operated to maintain fluid pressure to supply wheel brake actuation when required by opening the corresponding solenoid operated apply valves by providing electrical energy thereto while the release valves remain closed. The electrically driven pump motor is powered into operation when the system recognizes an incipient wheel-lock condition. To reduce brake pressure at particular wheel brake actuators, the corresponding solenoid release valves are supplied with electrical energy and opened while the apply valves remain closed relieving wheel brake pressure through the inlet to the motor driven pump and on to the reservoir.

In order to control the rate at which the pressure builds or decays in the wheel brake actuator the solenoid valves are typically pulsed opened and closed in a very rapid fashion to effectively control the flow rate of fluid either to or from the wheel brake as needed. This tends to excite audible noise and vibrations in the system which may be perceivable and therefore, are generally considered as undesirable. Therefore, conventional braking systems capable of ABS operation generally incorporate some means of reducing the effects of solenoid generated noise.

SUMMARY OF THE INVENTION

According to an aspect of the present invention a rotary actuated braking system is provided which functions using a single solenoid operated valve to control ABS functions to all control channels rather than the numerous solenoid operated valves that are typically required in a conventional system.

More particularly, a braking system is provided which operates in a substantially conventional manner during normal bass brake operation when ABS functioning is not required. The rotary actuator's drive motor is activated when an incipient wheel-lock condition is sensed such that ABS related functions may be required. A position sensor is used to detect the rotational position of the actuator motor shaft.

The actuator includes a rotary allocation valve that rotates at motor speed and is supplied with brake fluid at atmospheric pressure. A pressure allocation path is provide by a single inlet from the solenoid valve of the system to the allocation valve and is applied therefrom to a plurality of staged outlet channels. The allocation valve includes a means to allow flow to each of the plurality of outlet channels individually, in sequence during rotation. An individual control channel is supplied by each of the outlet channels.

In a preferred embodiment described herein there are three outlet channels. One channel to the right front brake, one channel to the left front brake and one channel to the two rear brakes. Each control channel is supplied independently during ABS operation. The system is readily adapted to operation with another number of control channels if preferred.

When ABS function is required at a given control channel, the solenoid valve is shuttled open when the allocation valve is at a predetermined position that corresponds with that particular staged outlet channel selected for ABS modulation and pressurized fluid is provided to effect operation of the control channel. The solenoid valve is closed quickly so as not to pressurize any control channel that does not presently require ABS modulation. The solenoid valve continues to be shuttled opened and closed in concert with registry of the rotating allocation valve at the selected stage thereof to develop pressure in the necessary control channels.

When a particular Control channel is pressurized, a pressure operated valve opens in response to the fluid pressure applied thereto through the allocation valve to permit decay of wheel brake pressures. The release pressure is stored in an accumulator and pumped back to the master cylinder through means of a piston pump carried in the rotary actuator and also preferably driven by the same motor shaft as the allocation valve. Pressure at particular wheel brakes is regulated by the controlled opening and closing of the pressure responsive valve.

Through means of the present invention a single solenoid operated valve controls ABS functions to all control channels of the braking system. A single motor driven common shaft can operate both the allocation valve and the piston pump to effect ABS operation. The rotary allocation valve is used to distribute pressure to activate system ABS functions while the pump pistons are used to move release braking fluid from the wheel brake actuators and return it to the reservoir.

According to a preferred aspect of the present invention, a rotary actuated braking system includes a rotary actuator with a housing having a longitudinal bore. The longitudinal bore carries a driven shaft with an eccentric segment, an undercut segment and a localized flat segment. The housing also carries at least one allocation valve piston that engages the eccentric segment and at least one ABS control piston that also engages the eccentric segment.

A solenoid valve port opens through the housing to the longitudinal bore at the undercut segment of the driven shaft. A pressure operated control valve port opens through the housing to the longitudinal bore at the allocation valve piston. A pressure operated release valve port opens to the longitudinal bore at the localized flat segment. An accumulator port opens through the housing to the longitudinal bore at the ABS control piston.

The solenoid valve selectively provides an open flow path between the solenoid valve port and either the pressure operated control valve port or the reservoir. Control fluid pressure is supplied to the pressure operated control valve through the pressure operated control valve port by operation of the allocation valve piston.

The control fluid pressure is supplied to the pressure operated release valve by operation of the allocation valve piston which provides fluid pressure through the pressure operated control valve port to the solenoid valve and from the solenoid valve selectively to the solenoid valve port. From the solenoid valve port the fluid pressure is supplied through the longitudinal bore at the undercut segment and the localized flat segment to the pressure operated release valve port and therethrough, to the pressure operated release valve. The solenoid valve is cycled selectively at the appropriate stage upon registry between the localized flat of the driven shaft and the pressure operated release valve port that corresponds to the control braking channel for which it has been determined that the ABS function is required. Through means of this operation a single control solenoid valve provides effective ABS control to vehicle braking systems.

DETAILED DESCRIPTION OF THE PRESENTLY PREFERRED EMBODIMENT

Figure 1A:
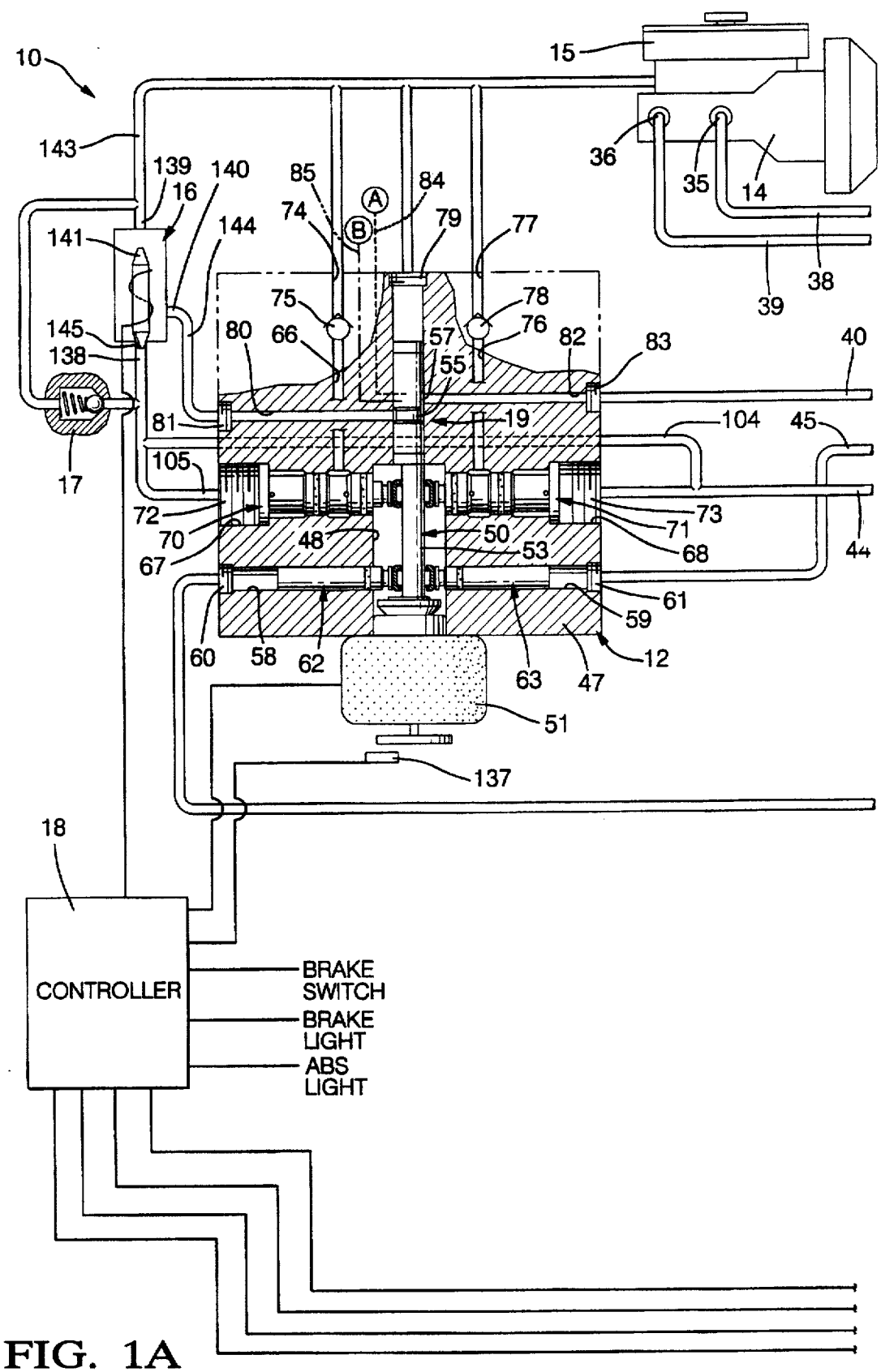
FIG. 1A illustrates in combination with FIG. 1B a rotary actuated braking system.
Figure 1B:
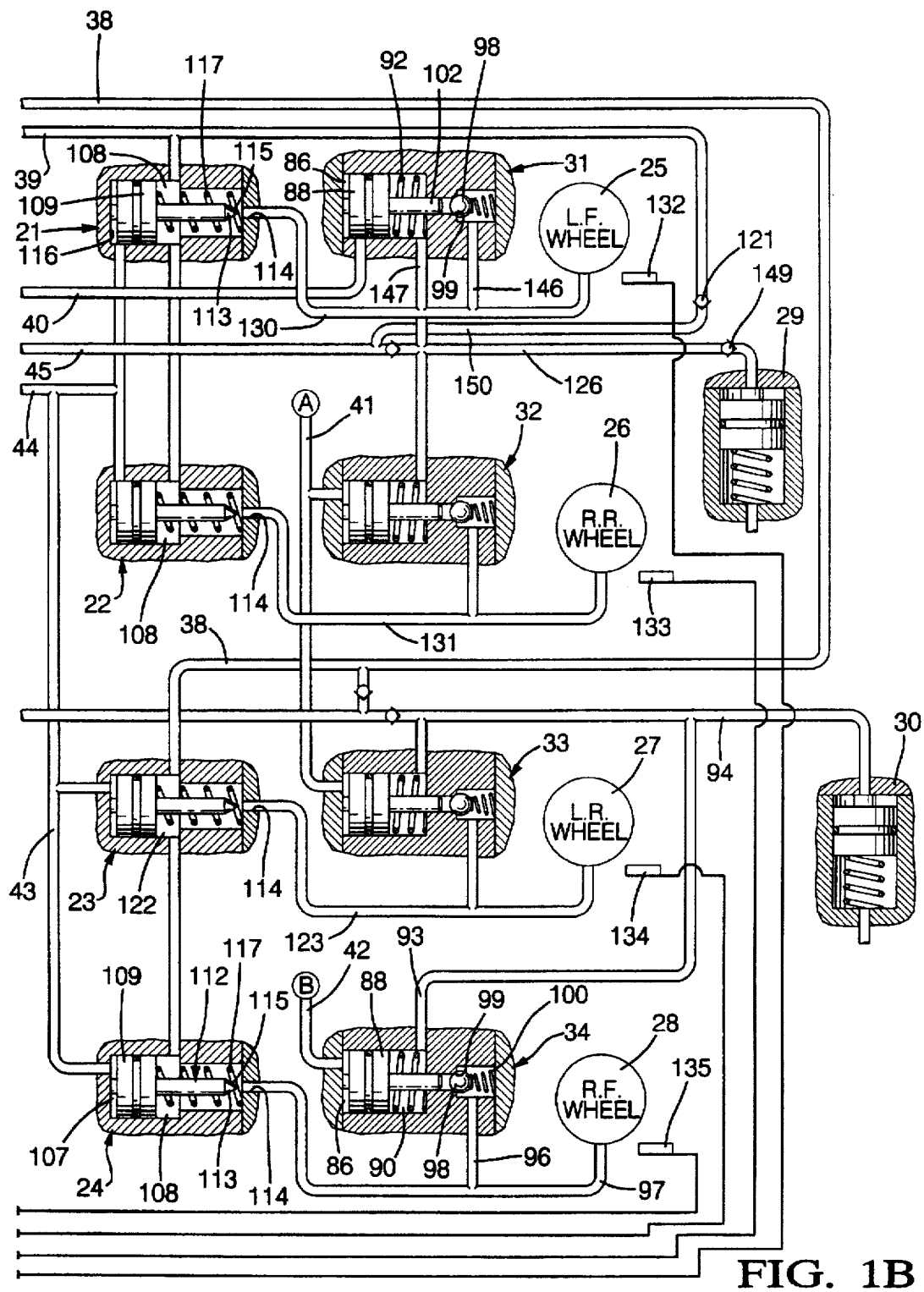
FIG. 1B illustrates in combination with FIG. 1A a rotary actuated braking system.

Referring to the drawings, illustrated in FIGS. 1A and 1B is a rotary actuated braking system designated in the aggregate as 10 and incorporating features of the present invention. The braking system 10 includes a conventionally boosted master cylinder 14 for generating braking pressure in response to the manual application of force to a brake pedal actuator (not illustrated). A fluid reservoir 15 is mounted on the master cylinder 14 and carries a supply of fluid for use in operation of the braking system 10. The master cylinder 14 includes outlet ports 35 and 36 to which are connected brake lines 38 and 39, respectively.

Brake line 38 is used to operate right front wheel brake 28 and left rear wheel brake 27 and brake line 39 is used to operated left front wheel brake 25 and right rear wheel brake 26. Therefore, the braking system 10 is generally arranged in a diagonally split configuration with two independent base braking channels actuated by master cylinder 14 through the brake lines 38 and 39. The wheel brakes 25–28 respond to the master cylinder 14 in a conventional manner with the remainder of the components of braking system 10 remaining in their normal positions during base brake operation.

The braking system 10 also includes a rotary actuator 12 which is brought into use in providing ABS related functioning of the braking system 10. A controller 18 monitors various vehicular operational aspects and controls the ABS functioning of braking system 10 in a preprogrammed manner in response to inputs provided therefrom.

In general terms, the braking system 10 also includes a solenoid operated valve 16 and a relief valve 17. The relief valve limits the maximum operating pressure of the braking system 10 and is set to release system pressure to the reservoir 15 at approximately 2500 psi in the present embodiment.

As shown in FIG. 1B, the braking system 10 also includes a series of pressure operated control valves 21–24 which are interposed in the brake lines 38 and 39 and therefore, carry fluid flow during base brake operation of the wheel brakes 25–28. In their normal position as illustrated control valves 21–24 permit free fluid flow between the brake lines 38 and 39 and the wheel brakes 25–28. During base brake operation, the pressure operated control valves 21–24 merely act as passive conduit segments for fluid pressure transmission between the master cylinder 14 and the wheel brakes 25–28.

Also illustrated in FIG. 1B are a series of pressure operated release valves 31–34 which selectively provide an open flow route between wheel brakes 25–28 and accumulators 29 and 30 for the release of fluid pressure from the wheel brakes 25–28 during ABS related operation of the braking system 10, and eventual return of excess fluid to the reservoir 15. During base brake operation the pressure operated release valves 31–34 remain in their normal positions illustrated to maintain the selected fluid pressure applied to the wheel brakes 25–28 by the master cylinder 14.

Figure 2:
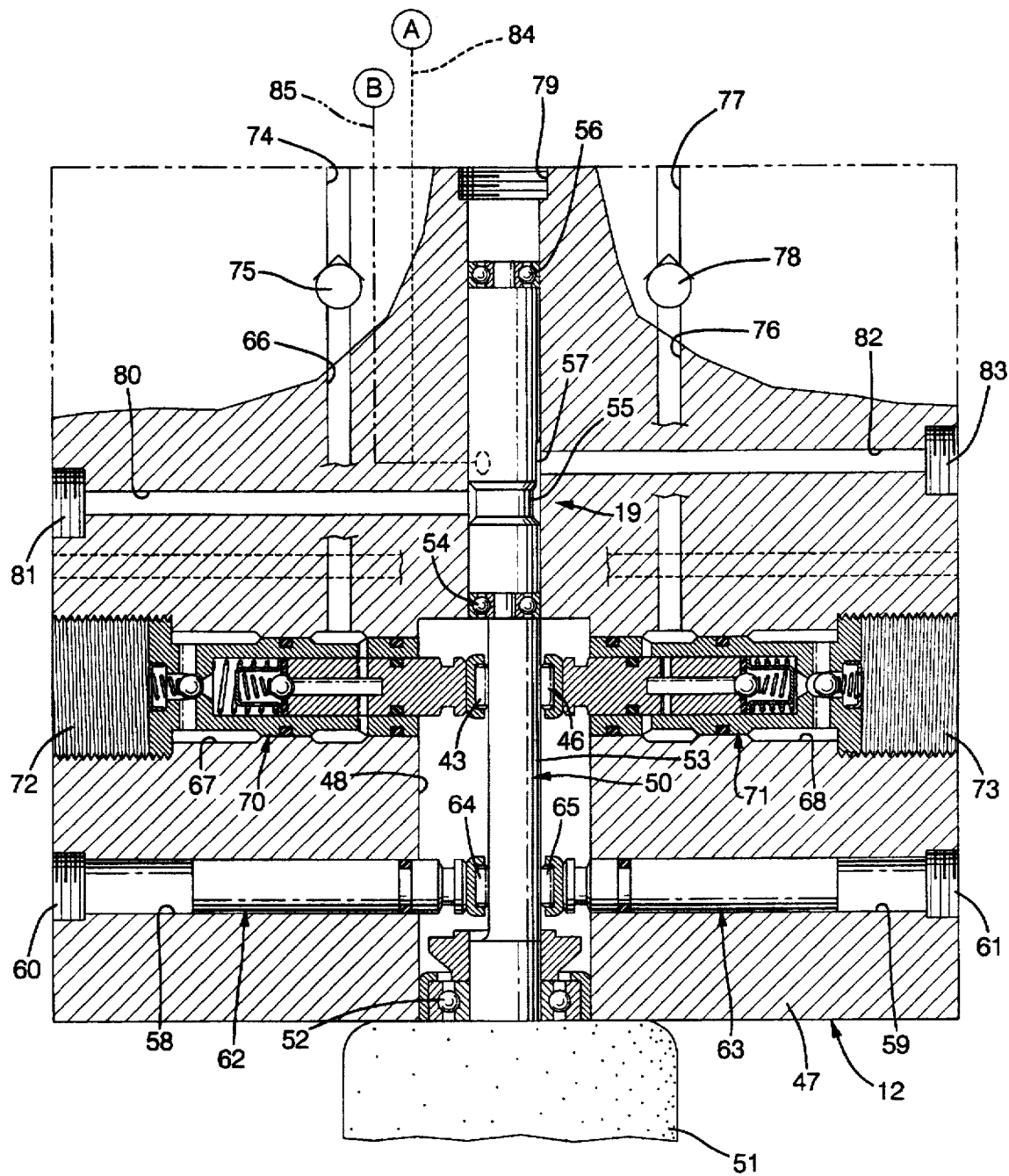
FIG. 2 is a cross sectional illustration of the rotary actuator of the rotary actuated braking system illustrated in FIGS. 1A and 1B.

The rotary actuator 12 is illustrated in FIG. 2 in greater detail and therefore, reference is directed thereto. Rotary actuator 12 includes a housing 47 which includes a stepped longitudinal bore 48. A driven shaft 50 extends substantially through the stepped longitudinal bore 48 and engages a single electrically operated motor assembly 51 which is rotationally supported against the housing 47 by bearing assemblies 52, 54 and 56. The driven shaft 50 includes an eccentric segment 53, an undercut segment 55 and a localized flat segment 57.

The housing 47 includes a series of bores which intersect the stepped longitudinal bore 48. These include bores 58 and 59 which form pressure operated release valve ports 60 and 61 respectively. The bores 58 and 59 carry reciprocating piston assemblies 62 and 63 each of which extend into the stepped longitudinal bore 48 and include roller bearing assemblies 64 and 65 which engage the eccentric segment 53 of driven shaft 50. Accordingly, during rotational motion of driven shaft 50 the pistons 62 and 63 are caused to reciprocate within the bores 58 and 59 by means of engagement with the eccentric segment 53.

The housing 47 also includes bores 67 and 68 which intersect the stepped longitudinal bore 48 and which carry piston pump assemblies 70 and 71, respectively. The bores 67 and 68 provide pressure operated control valve ports 72 and 73, respectively. piston pump assemblies 70 and 71 include roller bearings 43 and 46 respectively, which engage the eccentric segment 53 of the driven shaft 50. Therefore, rotation of the driven shaft 50 effects reciprocation of elements of the piston pump assemblies 70 and 71 in the bores 67 and 68, respectively.

A bore 66 extends through housing 47 forming reservoir port 74 and intersecting the bore 67. The bore 73 carries a check valve 75 and serves as a fluid supply route for the piston pump assembly 70. Similarly, a bore 76 extends through housing 47 forming reservoir port 77. The bore 76 carries a check valve 78 and serves as a fluid supply line to piston pump assembly 71. An additional reservoir port 79 is formed at the end of stepped longitudinal bore 48 and provides a means of returning fluid leakage from the stepped longitudinal bore 48 to the reservoir 15.

Bore 80 extends through housing 47 and intersects the stepped longitudinal bore 48 at undercut segment 55. Bore 80 forms solenoid port 81. Bore 82 extends through housing 47 and forms pressure regulated release valve port 83. Bore 82 intersects stepped longitudinal bore 48 at undercut segment 57. Two additional bores equivalent to bore 82 and intersecting the stepped longitudinal bore 48 at undercut segment 57 are out of the plane shown in the illustration of FIG. 2 and are designated by reference numerals 84 and 85 and form pressure regulated release valve ports A and B respectively.

Figure 3:
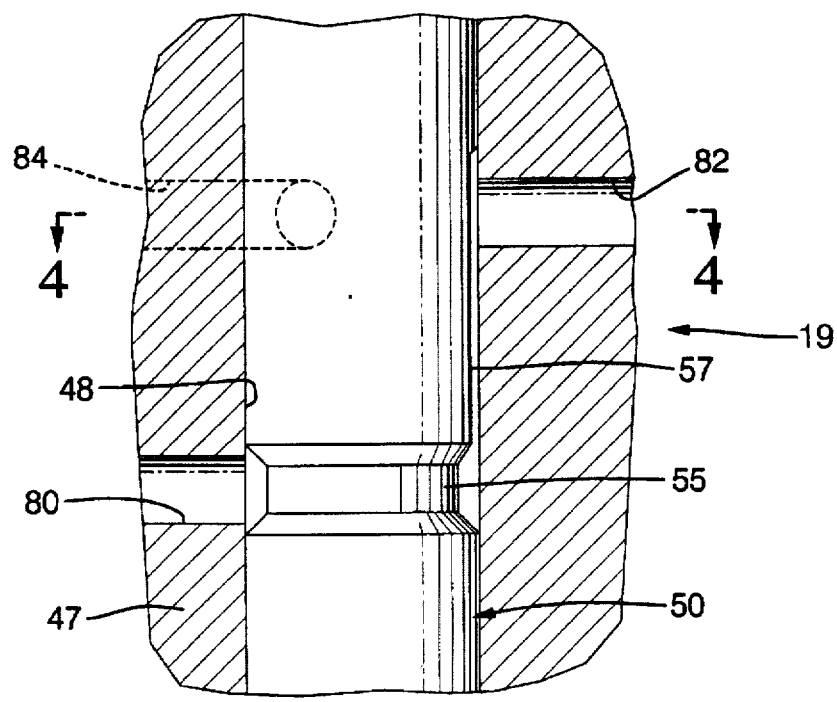
FIG. 3 is a detail illustration of the rotary valve of the rotary actuator of FIG. 2.
Figure 4:
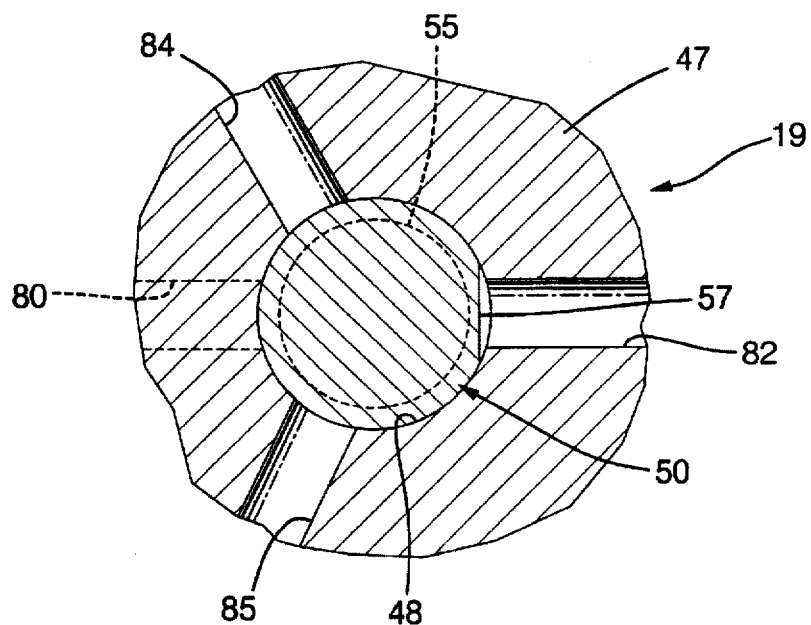
FIG. 4 is a cross sectional illustration taken generally through the plane indicated by the line 4—4 in FIG. 3.

The undercut segment 55 and localized flat segment 57 of driven shaft 50 operate as part of an allocation valve assembly 19. Referring to FIGS. 3 and 4, the allocation valve assembly 19 is illustrated in greater detail. As shown in FIG. 3, the undercut segment 55 and the localized flat segment 57 of driven shaft 50 provide a means for fluid to communicate through the stepped longitudinal bore 48 between the bore 80 and, in the position illustrated, the bore 82.

As can be seen from FIG. 4 during rotation of the driven shaft 50 the localized flat segment 57 will, in-sequence, pass through stages of registry with bore 82, bore 84 and bore 85 in succession and repeatedly. When this occurs, fluid communication is sequentially permitted between bore 80 and each of the bores 82, 84 and 85 individually. Accordingly, as the driven shaft 50 rotates, communication is provided in-sequence, between the solenoid port 81 and the three pressure operated release valve ports 83, A and B.

Referring again to FIG. 2, it is now apparent that the sole driven shaft 50 operates to drive piston assembly 62 and 63, piston pump assembly 70 and 71 and allocation valve assembly 19.

Referring again to FIGS. 1A and 1B in combination, it can be see that the pressure operated release valve port 83 communicates with pressure operated release valve assembly 31 through the conduit 40. Similarly, the pressure operated release valve port A communicates with the pressure operated release valve assemblies 32 and 33 through conduit 41 and the pressure operated release valve port B communicates with the pressure operated release valve assembly 34 through the conduit 42.

Figure 7:
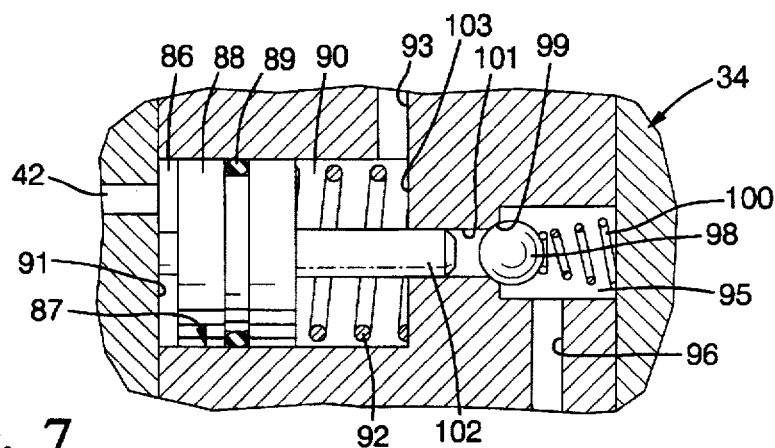
FIG. 7 is a cross sectional illustration of the pressure operated release valves of FIG. 1B shown in a normal position.
Figure 8:
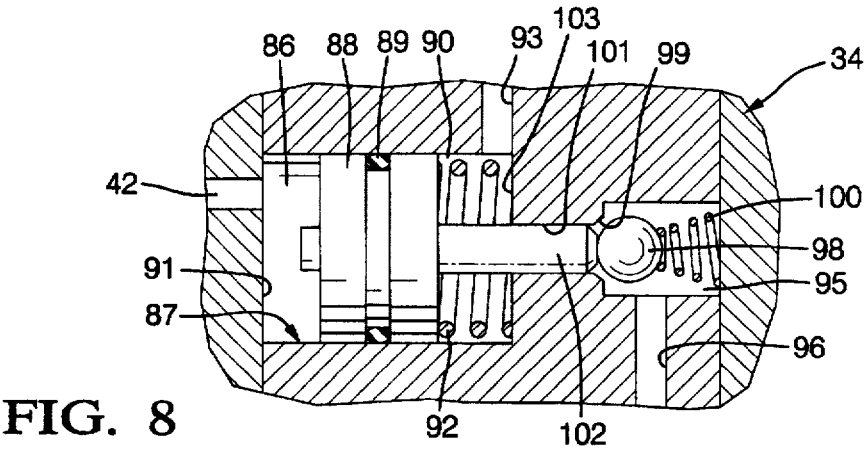
FIG. 8 is a cross sectional illustration of the pressure operated release valves of FIG. 1B shown in an activated position.

The pressure operated release valve assemblies 31–34 are substantially identical in structure and function and so the description of the details thereof will be limited to the pressure operated release valve assembly 34 which is illustrated in its normal position in FIG. 7 and then actuated position in FIG. 8. It is apparent that the features of the pressure operated release valves 31–34 such as orifice size, spring strength and piston size will be selected for the particular braking system that the invention is applied to and therefore, may vary.

Referring to FIG. 7, the conduit 42 communicates with chamber 86 of the representative pressure operated release valve assembly 34. The chamber 86 is part of bore 87 which slidably carries piston 88. The piston 88 includes a seal 89 which fluidly separates chamber 86 from chamber 90 in bore 87. The piston 88 is normally biased against the end 91 of bore 87 by a return spring 92. A conduit 93 provides an opening to chamber 90 and, as seen in FIG. 1B, conduit 93 communicates with conduit 94 which extends to accumulator assembly 30.

The pressure regulated release valve assembly 34 also includes a chamber 95 that is open through conduit 96 to conduit 97. Conduit 97 communicates with the front wheel brake 28. Conduit 93 communicates with accumulator 30. The chamber 95 carries a check ball 98 that is biased against seat 99 by return spring 100 in the normal position illustrated in FIG. 7. The pressure operated release valve assembly 34 also includes a bore 101 that extends between chambers 90 and 95. The piston 88 carries a push rod 102 that extends through bore 101 and is engageable with the check ball 98.

The representative pressure regulated release valve 34 is illustrated in its actuated position in FIG. 8. In operation, when the fluid pressure in chamber 86 is increased through conduit 42 sufficient to compress the return spring 92 the piston 88 is caused to move toward the end 103 of bore 87. In coordination therewith, the push rod 102 slides through the bore 101 forcing check ball 98 off the seat 99 and compressing the spring 100. A clearance 104 between the push rod 102 and bore 101 permits fluid communication between the chambers 90 and 95 such that an open flow path is established between conduits 93 and 96 through the pressure operated relief valve assembly 34. When the fluid pressure in chamber 86 is relieved, the piston 88 returns to the end 91 of bore 87 reseating check ball 98 upon the valve seat 99 and closing the flow path through the valve between bores 93 and 96.

Referring again to FIGS. 1A and 1B, the pressure regulated control valve ports 72 and 73 are in continuously open fluid communication with one another through the conduits 44, 104 and 105. Therefore, the ports 72 and 73 are in communication with the pressure operated control valve assemblies 21–24 through the conduit 44. The pressure operated control valves 21–24 are substantially identical in structure and function. The details of the pressure operated control valves 21–24 are illustrated in FIG. 5 wherein the representative valve 24 is illustrated in its normal position and FIG. 6 wherein the representative valve 24 is illustrated in its actuated position.

Figure 5:
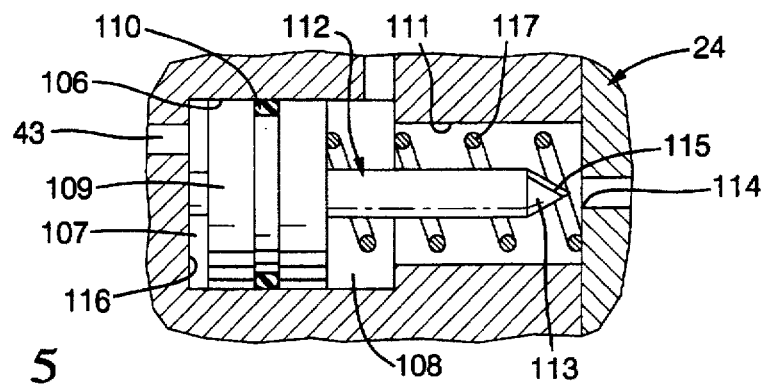
FIG. 5 is a cross sectional illustration of the pressure operated control valves of FIG. 1B shown in a normal position.

Referring to FIG. 5, the pressure operated control valve assembly 24 includes bore 106 which is separated into chambers 107 and 108 by piston 109. The piston 109 is slidably carried in bore 106 and includes a seal 110 to provide fluid separation between chambers 107 and 108. The pressure operated control valve 24 also includes a bore 111 that extends from bore 106 and is slightly smaller in diameter relative thereto. Extending from the piston 109 is a rod 112 that includes a tip 113 that is engageable with valve seat 114. The tip 113 includes an orifice formed by slot 115. The piston 109 and the rod 112 are coordinately biased toward the end 116 of bore 106 by the return spring 117.

Figure 6:
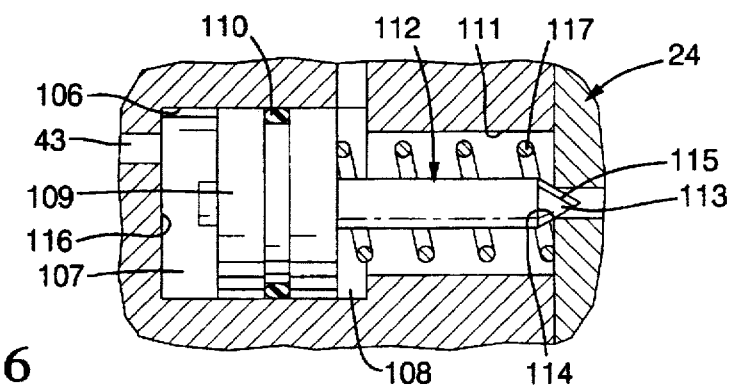
FIG. 6 is a cross sectional illustration of the pressure operated control valves of FIG. 1B shown in an activated position.

Referring to FIG. 6, the pressure operated control valve 24 is illustrated in its actuated position. The chamber 107 is opened to the conduit 43 which as shown in FIGS. 1A and 1B, extends to conduit 44, and therethrough, to the piston pumps 70 and 71. When the fluid pressure in chamber 107 is increased, fluid flow through conduit 43 to the piston 109 is caused to slidingly move in the bore 106 compressing the spring 117 and moving the tip 113 of rod 112 against the seat 114. This substantially cuts off fluid flow and fluid pressure transmission through the pressure operated control valve 24 between the brake line 38 and the conduit 97 which extends to the right front wheel brake 28. However, the orifice formed by groove 115 permits a small continuously opened flow path for a metered amount of fluid flow or fluid pressure transmission through the pressure operated control valve 24 when the tip 113 rests upon the seat 114.

Referring again to FIGS. 1A and 1B in combination, the operation of braking system 10 will be described in greater detail. During normal base brake operation when the master cylinder 14 is actuated to effect braking operation, fluid pressure is transmitted through the ports 35 and 36 of the master cylinder 14 to the braking lines 38 and 39 which supply two braking channels arranged in a diagonally split configuration within the embodiment illustrated as braking system 10. Fluid flow is effected from the master cylinder 14 due to displacement of the actuating wheel brakes 25-28. The fluid enters the braking system 10 through the brake lines 38 and 39. Fluid flow is prevented at the in-line check valve 120.

Fluid flow in braking line 38 is freely transmitted into chambers 122 of pressure operated control valve 23 and chamber 108 of pressure operated control valve 24 while the valves 23 and 24 remain in their normal positions. Fluid in pressure operated control valve 23 is freely transmitted through open valve seat 114 into conduit 123 for conventional actuation of left rear wheel brake 27. Fluid in pressure operated control valve 24 is freely transmitted through valve seat 114 into conduit 97 for conventional actuation of right front wheel brake 28.

Similarly, fluid pressure transmitted from the master cylinder 24 into the braking line 39 is interrupted by in-line check valve 121. However, the fluid pressure in braking line 39 is freely transmitted into chamber 108 of pressure operated control valve 21 and chamber 108 of pressure operated control valve 22 with valves 21 and 22 remaining in their normal positions. Fluid from chamber 108 of pressure operated control valve 21 is freely transmitted through the open valve seat 114 into conduit 130 and therethrough, to left front wheel brake 25 for conventional actuation thereof. Similarly, fluid in chamber 108 of pressure operated control valve 22 is freely transmitted through the seat 114 into conduit 131 and therethrough to the right rear wheel brake 26 for conventional actuation thereof. When actuation travel of wheel brakes 25-28 is complete the pressure is increased as determined by actuation of master cylinder 14.

By way of example, it can seen that the fluid pressure communicated from master cylinder 14 to right front wheel brake 28 through conduit 97 is also available in conduit 96 and therethrough, into pressure operated release valve 34. However, the fluid pressure is maintained from being transmitted through the valve seat 99 by the check ball 98 which remains firmly seated by way of action of return spring 100. The pressure transmitted through conduit 96 assists in maintaining check ball in a seated position. Accordingly, in a substantially conventional fashion, as has been described, the actuation of master cylinder 14 is effective in applying the wheel brakes 25-28 in a substantially unrestricted fashion with the pressure operated control valves 21-24 remaining in their normal positions.

When the operation of braking system 10 encounters a situation wherein ABS related operation is required, as determined by the controller 18 through communication with various input sources including wheel speed sensors 132-135, the motor 51 is brought into operation effecting the rotation of driven shaft 50 of rotary actuator 12. The position sensor 137 provides information to the controller 18 about the precise angular position of the motor 51 and the directly driven shaft 50.

In response to rotation of the driven shaft 50, the piston pump assemblies 70 and 71 are immediately driven into operation by the driven shaft 50 which, through the conduits 105, 104 and effects pressurization of the chambers 86 of each of the pressure operated control valves 21-24. This results in movement of the pressure operated control valves 21-24 to the actuated position as shown in FIG. 6. The pressure operated control valves 21-24 substantially interrupt the transmission of fluid flow from the master cylinder 14 to the wheel brakes 25-28. An exception is the metering orifices, representative of which is a slot 115 of pressure operated control valve 24 which provide a small continuously open path through the valves 21-24. The piston pumps 70 and 71 additionally apply pressure through the conduit 105 to the port 138 of solenoid valve 16 and to the relief valve 17. The relief valve 17 maintains maximum system pressure at approximately 2500 psi and generally remains in the closed position shown.

The solenoid valve 16 is a relatively simple device readily constructed by one skilled in the art. Solenoid valve 16 includes a shuttle 141 which is normally maintained in a position such that port 138 is substantially closed at the solenoid valve 16 and port 139 which communicates through conduit 143 with reservoir 15 is open to the conduit 144 through port 140 and the solenoid valve 16. The conduit 144 communicates with the solenoid port 81 and therethrough, with the stepped longitudinal bore 48 at undercut segment 55. Therefore, with the solenoid valve 16 in the position shown, fluid is applied through the solenoid port 81 to the allocation valve assembly 19 at atmospheric pressure through communication with reservoir 15. During this activity, fluid pressure applied by the master cylinder 14 to the wheel brakes 25-28 is maintained since a closed loop exists between the master cylinder 14 and the wheel brakes.

During braking operation when the controller 18 establishes that ABS modulation of the braking pressure at any particular wheel brake(s) 25-28 is required, the corresponding pressure operated release valve or valves 31-34 is/are moved to their actuated position as shown in FIG. 8 by operation of the allocation valve assembly 19. With the localized flat 57 of driven shaft 50 rotating at the speed of motor 51, a sequential registry with bores 82, 84, and 85 occurs in successive stages. When the localized flat 57 approaches registry with the bore 82, 84 or 85 which corresponds to the pressure operated release valves 31-34 which correspond to the wheel brake in need of ABS modulation, the solenoid valve 16 is pulsed to permit fluid communication between the ports 138 and 140 thereof, so that fluid pressure is transmitted through conduit 144, solenoid port 81 and bore 80 to the stepped longitudinal bore 48 at undercut 55 and through the localized flat 57 to the associated bore 82, 84 or 85.

For example, pressurization at bore 82 results in a transmission of fluid pressure through pressure operated release valve port 83 and conduit 40 to chamber 86 of pressure operated release valve 31 which effects movement of piston 88 compressing spring 92 causing rod 102 to move check ball 98 off seat 99. This permits a release of braking fluid pressure from left front wheel brake 25 through conduit 130, conduit 146, pressure operated release valve 31, conduit 147 and conduit 126 to accumulator 29. This interrupts the normal closed loop that exists between the master cylinder 14 and the wheel brakes 25-28 releasing fluid therefrom.

The solenoid valve 16 is repeatedly pulsed when each revolution of driven shaft 50 establishes registry between localized flat 57 and bore 82 of the allocation valve assembly 19 to maintain actuation of pressure operated release valve 31 to effectively limit wheel lock-up of left front wheel brake 25. The released fluid which is received in accumulator 29 is drawn through conduit 126, check valve 149 and conduit 45 to pressure operated release valve port 61 of rotary actuator 12 and into bore 59 by reciprocal motion of piston assembly 63 in response to rotation of driven shaft 50.

Reciprocation of piston assembly 63 is also effective to return fluid through the conduit 45, conduit 150, check valve 121 and braking line 39 to the reservoir 15 through master cylinder During ABS operation, when it becomes necessary to reapply fluid pressure to the left front wheel brake 25, the cycling of solenoid valve 16 is stopped and fluid pressure which has moved pressure operated release valve 31 to the actuated position is released through reservoir port 79 and returned to reservoir 15 so that the piston 88 is returned by return spring 92 receiving check ball 98 against seat 99 ceasing the pressure release from left front wheel brake 25. Fluid pressure is reapplied through the metering orifice provided by slot 115 at the tip 113 of pressure operated control valve 21 to reapply the left front wheel brake 25. If required, additional release and reapply cycles can be repeated as often as necessary.

When ABS operation is no longer required, the operation of motor 51 is halted and the return spring 117 moves piston 109 of pressure operated control valve 21 back against the end 116 of bore 106 reopening the valve seat 114. Fluid pressure from the chamber 86 is allowed to return to the reservoir 15 through slot 145 of solenoid valve 16. Slot 145 is formed in shuttle 141 and provides a control orifice through the port 138 that permits fluid flow to reservoir 15, relieving the fluid pressure.

In a similar manner, the allocation valve 19 is effective to pressurize the pressure operated release valve 34 through port B and conduit 42 to release pressure from right front wheel brake 28. Additionally, the allocation valve 19 is operable to pressurize, simultaneously, pressure operated release valves 32 and 33 through port A and conduit 41 to release braking pressure from right rear wheel brake 26 and left rear wheel brake 27.

By means of the braking system 10 a single solenoid valve 16 in combination with a motor driven rotary actuator 12 is effective in providing ABS operation during braking operation when incipient lock conditions of wheel brakes 25–28 are encountered. The master cylinder 14 remains effective in applying the wheel brakes 25–28 when the valves 21–24 and 31–34 are returned to their normal positions.

What is claimed is:

1. A rotary actuated braking system comprising:
   a rotary actuator including a housing having a longitudinal bore carrying a driven shaft with an eccentric segment, an undercut segment and localized flat segment, the housing also carrying a piston engaging the eccentric segment of the driven shaft wherein the housing includes a solenoid port opening to the longitudinal bore at the undercut segment of the driven shaft, a first valve port opening to the longitudinal bore at the piston and a second valve port opening to the longitudinal bore at the localized flat segment of the driven shaft.

2. A rotary actuated braking system according to claim 1 further comprising a second piston carried by the housing and engaging the eccentric segment of the driven shaft with an accumulator port in the housing opening to the longitudinal bore at the second piston.

3. A rotary actuated braking system according to claim 2 further comprising a master cylinder and a wheel brake normally in fluid communication with the master cylinder and further comprising a pressure operated control valve operable in response to fluid pressure delivered from the first valve port of the rotary actuator to selectively interrupt fluid communication between the master cylinder and the wheel brake.

4. A rotary actuated braking system according to claim 3 wherein the pressure operated control valve includes a slot providing a continuously open restricted orifice between the master cylinder and the wheel brake.

5. A rotary actuated braking system according to claim 4 further comprising a normally closed fluid path between the wheel brake and the accumulator port of the rotary actuator with a pressure operated release valve disposed in the normally closed fluid path operable in response to fluid pressure delivered from the second valve port of the rotary actuator to open the normally closed fluid path.

6. A rotary actuated braking system comprising:
   a rotary actuator including a housing having a longitudinal bore carrying a driven shaft with an eccentric segment, an undercut segment and localized flat segment, the housing also carrying an allocation valve piston engaging the eccentric segment and an ABS control piston engaging the eccentric segment wherein the housing includes a solenoid valve port opening to the longitudinal bore at the undercut segment of the driven shaft, a pressure operated control valve port opening to the longitudinal bore at the allocation valve piston, a pressure operated release valve port opening to the longitudinal bore at the localized flat segment and the accumulator port opening to the longitudinal bore at the ABS control piston;
   a reservoir carrying fluid; and
   a solenoid valve selectively providing an open flow path between the solenoid valve port and one of the pressure operated control valve port and the reservoir;
   wherein a control fluid pressure is supplied to the pressure operated control valve port by operation of the allocation valve piston and to the pressure operated release valve port by operation of the allocation valve piston through the pressure operated control valve port to the solenoid valve and from the solenoid valve selectively to the solenoid valve port and therethrough to the longitudinal bore at the undercut segment and the localized flat segment.

7. A rotary actuated braking system according to claim 6 further comprising a master cylinder and a wheel brake normally in fluid communication with the master cylinder and further comprising a pressure operated control valve operable in response to fluid pressure delivered from the pressure operated control valve port of the rotary actuator to selectively interrupt fluid communication between the master cylinder and the wheel brake.

8. A rotary actuated braking system according to claim 7 wherein the pressure operated control valve includes a slot providing a continuously open restricted orifice between the master cylinder and the wheel brake.

9. A rotary actuated braking system according to claim 8 further comprising a normally closed fluid path between the wheel brake and the accumulator port of the rotary actuator with a pressure operated release valve disposed in the normally closed fluid path operable in response to fluid pressure delivered from the pressure operated release valve port of the rotary actuator to open the normally closed fluid path.

10. A rotary actuated braking system comprising:
    a master cylinder:
    a wheel brake;
    a normally open fluid path extending between the master cylinder and the wheel brake wherein selective actuation of the master cylinder results in application of the wheel brake;

a pressure operated control valve positioned in the normally open fluid path having a tip that is selectively engageable with a valve seat to close the normally open fluid path;

an accumulator:

a normally closed fluid path extending between the wheel brake and the accumulator;

a pressure operated release valve disposed in the normally closed fluid path having a movable element normally engaging a valve seat to close the pressure operated release valve wherein the movable element is selectively movable away from the valve seat to open the normally closed fluid path through the pressure operated release valve;

a rotary actuator communicating with and effecting operation of the pressure operated control valve and the pressure operated release valve. wherein the rotary actuator includes a piston carried in a bore for generating pressure to operate the pressure operated control valve; and a solenoid valve wherein the rotary actuator includes an allocation valve with a conduit extending between the piston bore and the allocation valve wherein the solenoid valve is disposed in and normally closes the conduit wherein the solenoid valve is selectively energized to open the conduit allowing fluid flow between the piston bore and the allocation valve and therethrough to the pressure operated release valve.

* * * * *